United States Patent
Vetter

[19]

[11] Patent Number: 5,808,858
[45] Date of Patent: Sep. 15, 1998

[54] ELECTRICAL CAPACITOR

[75] Inventor: Harald Vetter, Heidenheim, Germany

[73] Assignee: Siemens Matsushita Comp. GmbH & Co. KG, Bensheim, Germany

[21] Appl. No.: 807,594

[22] Filed: Feb. 27, 1997

[30] Foreign Application Priority Data

Feb. 29, 1996 [DE] Germany .................................. 19607737

[51] Int. Cl.$^6$ ...................................................... B65D 51/00
[52] U.S. Cl. ............................ 361/519; 361/520; 361/535; 361/540; 174/152 R
[58] Field of Search .................................... 361/519, 520, 361/518, 517, 536, 535, 537, 538, 540, 811, 821, 528, 532; 174/65 R, 65 G, 151, 152 R, 153 G, 152 G; 439/587, 589

[56] References Cited

U.S. PATENT DOCUMENTS 4,846,163 7/1989 Bannister, Jr. et al. ................. 361/821

*Primary Examiner*—Kristine L. Kincaid
*Assistant Examiner*—Anthony Dinkins
*Attorney, Agent, or Firm*—Hill & Simpson

[57] ABSTRACT

A gas-tight and/or oil-tight bushing is provided for attachment to a capacitor housing and for providing a connection to a capacitor. The bushings are composed of metal pins electrically insulated from the housing as well as insulators for increasing the leakage distance. The insulators have sections that extend into the inside of the housing to which a cooperating member that connects the bushing to the housing by clamping is secured. An O-ring is arranged between the insulator and the metal pin for sealing. The O-ring is preferably surrounded by a plastic sleeve that prestresses the O-ring for an improved sealing function.

15 Claims, 1 Drawing Sheet

ELECTRICAL CAPACITOR

The present invention is directed to electrical capacitors. More specifically, the present invention is directed to electrical capacitors contained in sealed housings.

BACKGROUND OF THE INVENTION

U.S. patent application Ser. No. 08/604,766 now abandoned, discloses a power capacitor that is built into a closed gas-tight and/or oil-tight housing that comprises mountable bushings for the capacitor terminals. The bushings include an insulator which electrically insulates the pins from the housing and serves to increase the leakage distance. The insulators have sections extending into the inside of the housing to which a cooperating member that connects the bushing to the housing by bracing is secured resulting in a clamping action between the insulator and cooperating member with the housing disposed therebetween.

It has been shown that the gas-tightness and/or oil-tightness of the above-identified capacitor is not assured under certain circumstances and in all conditions of use. This is especially true given the short structural heights and the pressure gelling process that is applied in the manufacture of the insulator. Specifically, the pressure gelling process does not always insure that the different coefficients of linear expansion of the metal pin, which may be fabricated from brass, and the insulator, which may be fabricated from plastic, can be reliably compensated for.

The above-described difficulties result in an unacceptably high reject rate or failure rate, especially after the housing is tightly soldered. Further, drastically changing temperatures can result in different rates of expansion and contraction of the metal pin and insulator which can compromise the gas-tightness and/or oil-tightness of the capacitor. As a result, capacitor failure is common during extreme environmental conditions and the service life of the electrical capacitor may be significantly shortened It is therefore an object of the present invention to insure against gas and/or oil invasion in sealed electrical capacitors even under difficult environmental conditions.

SUMMARY OF THE INVENTION

This object is inventively achieved in that an O-ring is arranged between insulator and metal pin.

More specifically, the present invention is directed toward a bushing that is mounted to a housing for a capacitor connection. The bushing includes a insulator that accommodates a metallic pin that serves as a capacitor terminal. An improved seal is provided between the metal pin and the insulator by providing a recess in the metal pin for accommodating an O-ring and by further providing a wider recess in the insulator for accommodating a plastic sleeve. The sealing engagement between the O-ring and the plastic sleeve provides an improved gas-tight and oil-tight seal between the metal pin and the insulator. The inventors have found that the seal provided by the O-ring/sleeve combination is effective over both normal and extreme operating temperature conditions.

It is therefore an object of the present invention to provide an improved seal between a metal pin or capacitor terminal and an insulator body of a mountable gas-tight and oil-tight capacity bushing.

Yet another object of the present invention is to provide an improved gas-tight and oil-tight capacitor bushing.

Yet another object of the present invention is to provide an improved method of manufacturing gas-tight and oil-tight capacitor bushings.

Other objects and advantages of the present invention will become apparent upon reading the following detailed description and independent claims, and upon reference to the accompany drawings.

BRIEF DESCRIPTION OF THE DRAWING

For a more complete understanding the present invention, reference should now be made to the embodiment illustrated in greater detail on the accompanied drawing and described below by way of an example of the present invention.

Figure 1:
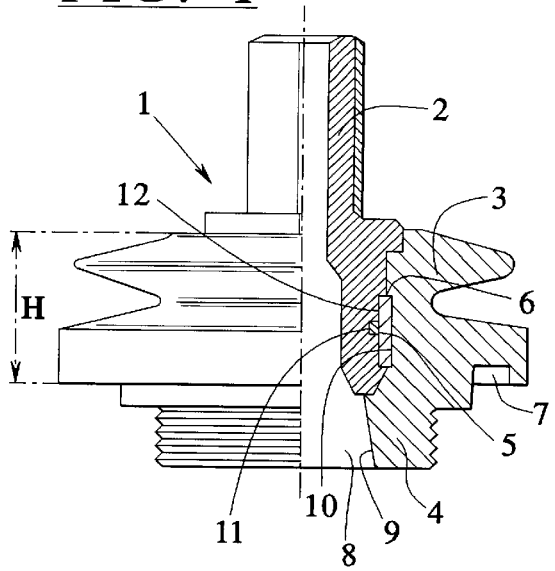
FIG. 1. is a sectional view of a bushing assembly fabricated in accordance with the present invention.

It should be understood that the drawing is not necessarily the scale and that the embodiment is illustrated by a diagrammatic representation in fragmentary view. In certain instances, details which are not necessary for an understanding of the present invention or which render other details difficult to perceive have been omitted. It should be understanding, of course, that the invention is not necessarily limited to the particular embodiment illustrated herein.

DETAILED DESCRIPTION OF THE PREFERRED EMBODIMENTS

The advantages of the present invention are explained in greater detail with reference to the following exemplary embodiments.

FIG. 1 illustrates a lead through insulator assembly 1 that, for example, is built into the cover (not shown in FIG. 1) of a metallic capacitor housing.

In broad terms, the present invention as illustrated in FIG. 1 comprises a capacitor bushing assembly 1 that can be sealingly mounted to a housing (not shown). A bushing assembly 1 comprises a capacitor terminal or metal pin 2 as accommodated within an insulator 3. To improve the seal between the pin 2 and insulator 3, an O-ring 5 is disposed between the pin 2 and insulator 3. In a preferred embodiment, the inside surface of the insulator 3 includes a slot for accommodating at least a portion of a sleeve 6. Preferably, the sleeve 6 is a plastic sleeve, and more preferably, the sleeve 6 is fabricated from the same material as the insulator 3. Further in the preferred embodiment, the pin 2 includes a slot for accommodating the O-ring 5. The O-ring 5 is sealingly accommodated between the slot disposed on the outside surface of the pin 2 and the sleeve 6.

In still another preferred embodiment, the bushing assembly 1 includes three slots related to the O-ring 5. A first slot 11 is disposed on the inside surface 9 of the through passageway 8 of the insulator 3. The first slot 10 is for accommodating at least a portion of the sleeve 6. A second slot 11 is disposed along the outside surface of the metal pin 2 for accommodating the O-ring 5. A third slot 12 is also disposed along the outside surface of the metal pin 2 for accommodating at least a portion of the sleeve 6. The third slot 12 and first slots 10 are disposed in an opposing alignment with respect to each other so that the sleeve 6 is accommodated between the first slot 10 and the third slot 12. The second slot 11, which accommodates the O-ring 5, is disposed within the third slot 12 of the metal pin 2.

Therefore, the sleeve 6 may be accommodated in a slot 10 disposed along the inside surface of the through passageway of the insulator 3, or the sleeve 6 may be accommodated in a slot 12 disposed along the outside surface of the metal pin 2, or the sleeve 6 may be disposed in a combination of two slots 10, 12, one slot disposed along the inside surface of the insulator 3 and another slot disposed along the outside surface of the metal pin 2. Preferably, the O-ring 5 is accommodated in a slot disposed long the outside surface of the metal pin 2. However, it is anticipated that the O-ring 5 could be accommodated in a slot disposed along the inside surface of the insulator 3.

The metallic pin 2 may include an outside thread and through bore, and alternatively with a blind bore and, potentially, thread. The metal pin 2, which is preferably fabricated as a turned brass part, is embraced by the insulator 3 that is composed either of synthetic resin (preferably epoxy resin) and/or silicone (produced by vacuum casting and/or vacuum degasification and/or pressure gelling in order to avoid undesirable bubbles) or of polymer ceramic as well (processed in an adequate process technology).

Figure 2:
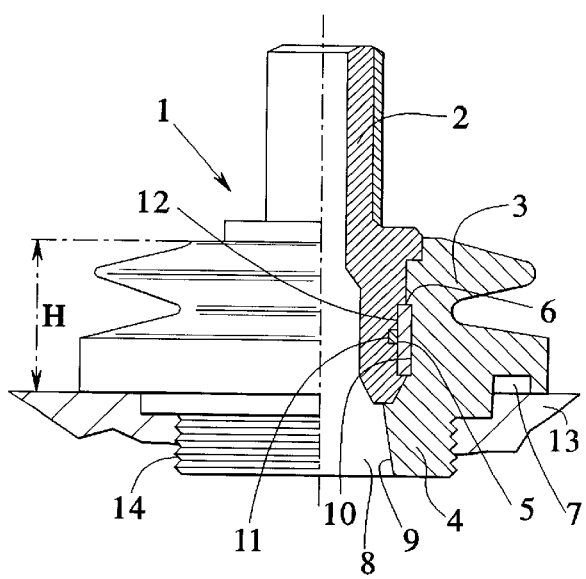
FIG. 2 is a sectional view of another embodiment of a bushing assembly of the present invention particularly illustrating a bushing assembly with a lower threaded end that is threadably connected to a housing.

The insulator 3 has a lower section 4 that extends into the interior (not shown in FIG. 1; see FIGS. 2–4) of the housing as illustrated in U.S. patent application Ser. No. 08/604,766 now abandoned. As shown in FIG. 2, the lower section 4 has an applied thread 14. As shown in FIG. 4, by screwing to the lower section 4 to a cooperating member 16, the bushing 1 can thus be clamped to a corresponding opening of the capacitor housing 13, for example onto the cover of such a housing. The required seal between insulator 3 and capacitor housing 13 is achieved, for example, by an O-ring (not shown in the FIG. 1) that is attached in a recess 7 arranged on the insulator.

Figure 3:
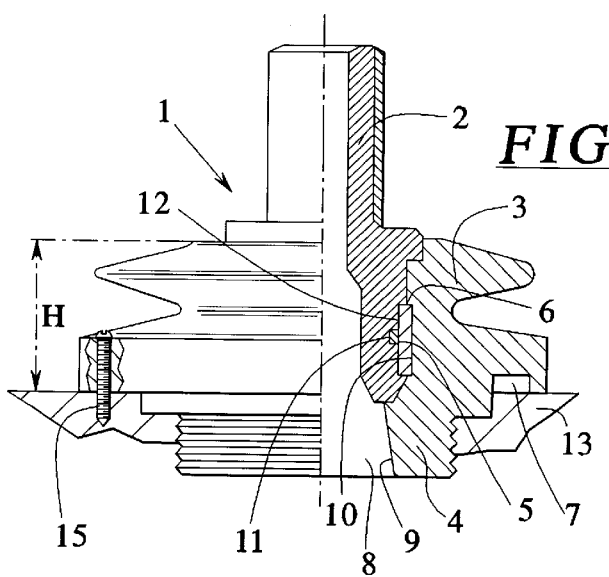
FIG. 3 is a sectional view of another embodiment of a bushing assembly made in accordance with the present invention particularly illustrating a bushing assembly attached to a housing by way of a plurality of annularly arranged screws.
Figure 4:
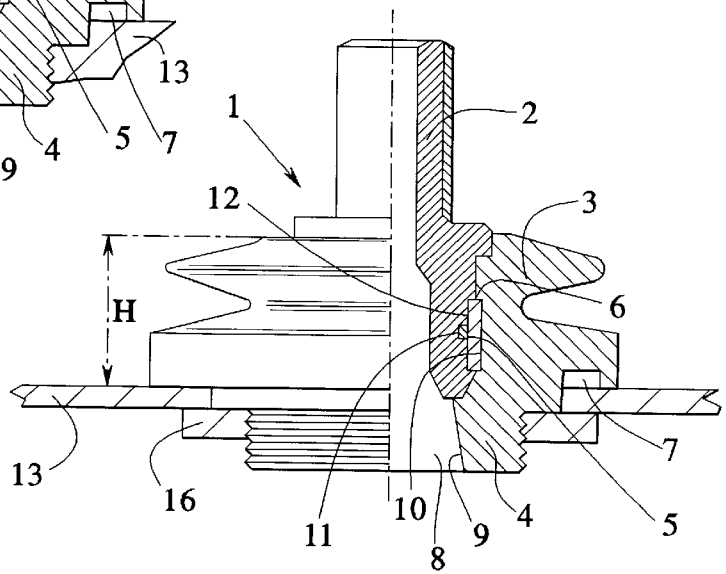
FIG. 4 is a sectional view of another embodiment of a bushing assembly made in accordance with the present invention particularly illustrating the connection of the bushing assembly to a housing with a threaded cooperating member.

In an alternative embodiment shown in FIG. 3, no thread is applied at the section 4 and the bracing to the housing is provided by annularly arranged screws, one of which is shown at 15 in FIG. 3.

In yet another alternative embodiment, the desired seal between the insulator 3 and the housing can be achieved by gluing the insulator 3 to the housing or, respectively, the clamping action disclosed in application Ser. No. 08/604, 766 now abandoned, can be combined with gluing the insulator 3 to the housing.

For eliminating the difficulties initially recited with respect to prevention an invasion of gas and/or oil, an O-ring 5 is arranged between metal pin 2 and insulator. This O-ring 5 is preferably prestressed to the intended sealing function with the assistance of a plastic sleeve 6. The material of the sleeve 6 is selected such (for example, epoxy resin, fiberglass-reinforced plastic material) that the material employed in the subsequent pressure gelling process unproblematically bonds or, respectively, sticks. As already mentioned, the insulator 3 and, thus, the sleeve 6 as well is preferably composed of an epoxy resin or, respectively of the base material of the insulator 3, i.e. of a duroplastic or a polymer ceramic. Of course, other thermoplastic materials or other suitable plastics can also be employed for insulator 3 and sleeve 6.

An alternative embodiment is characterized in that, following the manufacture of the fully cured insulator 3, the sleeve 6 together with the O-ring 5 recess are uniformly integrated, glued or, respectively, bonded to the insulator material. After the manufacture of the insulator 3, there is thus a fully functional oil-tight and gas-tight, axial seal of the O-ring 5. In this modification, the pin 2 can also be potentially mounted after the curing of the insulator material and an arbitrary, torque-stable, life-long fixing can be undertaken at the insulator 3 with a glueing.

If a crack should occur in the boundary surface disposed between metal pin 2 and insulator 3 as a consequence of strong thermal cycling, the elastic element composed of the O-ring 5 continues to see to faultless vacuum tightness, for those bushings that have a low structural height H.

From the above description, it is apparent that the objects of the present invention have been achieved. While only certain embodiments have been set forth, alternative embodiments and various modifications will be apparent from the above description to those skilled in the art. These other alternatives are considered equivalents and within the spirit and scope of the present invention.

What is claimed is:

1. An electrical capacitor bushing for mounting to a housing, the bushing comprising:

an insulator mounted onto the housing, the insulator further comprising central passageway for accommodating a metal pin, the central passageway comprising an inside surface, the inside surface including a slot for accommodating at least a portion of a sleeve, an O-ring being disposed between and engaging the sleeve and the pin, the O-ring providing a seal between the pin and the insulator.

2. The bushing of claim 1 wherein the pin further comprises an outer surface, the outer surface comprising a peripheral slot for accommodating the O-ring.

3. The bushing of claim 1 wherein the pin further comprises an outer surface, the outer surface comprising a first peripheral slot for accommodating the O-ring and a second wider peripheral slot for accommodating at least a portion of the sleeve, the first peripheral slot being disposed within the second peripheral slot, the O-ring being disposed between and engaging the first peripheral slot disposed on the pin and the sleeve.

4. The bushing of claim 1 wherein, the pin further comprises an outer surface, the outer surface comprising a second slot for accommodating the O-ring and a third slot for accommodating at least a portion of the sleeve, the second slot being disposed within the third slot, the third slot being in opposing alignment with the first slot so that the sleeve is accommodated between the first and third slots, the O-ring being disposed between and engaging the second slot of the pin and the sleeve.

5. The bushing of claim 1 wherein the sleeve is fabricated from the same material as the insulator.

6. The bushing of claim 1 wherein the insulator further comprises a lower extension that extends through to an opposing side of the housing, the lower extension being threaded, the bushing further comprising a threaded cooperating member that is threadably attached to the lower extension with the housing clamped therebetween.

7. The bushing of claim 6 wherein the lower extension and cooperating member are both glued to the housing.

8. The bushing of claim 6 wherein the lower extension of the insulator is attached to the housing with a plurality of annularly arranged screws.

9. An electrical capacitor bushing for mounting to a housing, the bushing comprising:

an insulator mounted onto the housing, the insulator comprising a central passageway for accommodating a metal pin, the central passageway comprising an inside surface, the inside surface comprising a first slot for accommodating at least a portion of a sleeve, the pin further comprises an outer surface for engaging the inside surface of the central passageway of the insulator, the outer surface of the pin comprising a second slot for accommodating an O-ring and a third slot for accommodating at least a portion of the sleeve, the second slot being disposed within the third slot, the third slot being in opposing alignment with the first slot so that the sleeve is accommodated between the first and third slots, the O-ring being disposed between and engaging the second slot of the pin and the sleeve, the sleeve and insulator being fabricated from the same material.

10. The bushing of claim 9 wherein the insulator further comprises a lower extension that extends through to an opposing side of the housing, the lower extension being threaded, the bushing further comprising a threaded cooperating member that is threadably attached to the lower extension with the housing clamped therebetween.

11. The bushing of claim 10 wherein the lower extension and cooperating member are both glued to the housing.

12. An electrical capacitor comprising:

a housing, a bushing mounting to the housing, the bushing comprising an insulator mounted onto the housing, the insulator comprising a central passageway for accommodating a metal pin, the central passageway comprising an inside surface, the inside surface comprising a first slot for accommodating at least a portion of a sleeve, the pin further comprises an outer surface for engaging the inside surface of the central passageway of the insulator, the outer surface of the pin comprising a second slot for accommodating an O-ring, the O-ring being disposed between and engaging the second slot of the pin and the sleeve, the insulator further comprises a lower extension that extends through to an opposing side of the housing, the lower extension being threaded, the bushing further comprising a threaded cooperating member that is threadably attached to the lower extension with the housing clamped therebetween.

13. The capacitor of claim 12 wherein the sleeve and insulator being fabricated from the same material.

14. The capacitor of claim 12 wherein the lower extension and cooperating member are both glued to the housing.

15. The capacitor of claim 12 wherein the pin further comprises a third slot for accommodating at least a portion of the sleeve, the second slot being disposed within the third slot, the third slot being in opposing alignment with the first slot so that the sleeve is accommodated between the first and third slots.

* * * * *